(12) United States Patent
Fedorov et al.

(10) Patent No.: US 12,135,806 B2
(45) Date of Patent: Nov. 5, 2024

(54) TOKEN GENERATION AND MANAGEMENT

(71) Applicant: UserClouds, Inc., Beaverton, OR (US)

(72) Inventors: Vladimir Fedorov, Menlo Park, CA (US); Stephen Garrity, Sonora, CA (US); Ramanujan Srinivasan, Seattle, WA (US)

(73) Assignee: UserClouds, Inc., Beaverton, OR (US)

( * ) Notice: Subject to any disclaimer, the term of this patent is extended or adjusted under 35 U.S.C. 154(b) by 0 days.

(21) Appl. No.: 18/184,340

(22) Filed: Mar. 15, 2023

(65) Prior Publication Data

US 2023/0297702 A1 Sep. 21, 2023

Related U.S. Application Data

(60) Provisional application No. 63/320,545, filed on Mar. 16, 2022.

(51) Int. Cl.
*G06F 21/62* (2013.01)
*H04L 9/40* (2022.01)
*H04L 9/32* (2006.01)

(52) U.S. Cl.
CPC ............ *G06F 21/62* (2013.01); *H04L 63/105* (2013.01); *H04L 63/107* (2013.01); *H04L 9/3213* (2013.01)

(58) Field of Classification Search
CPC ..... G06F 21/62; H04L 63/105; H04L 63/107; H04L 9/3213
See application file for complete search history.

(56) References Cited

U.S. PATENT DOCUMENTS

| 6,839,843 | B1 * | 1/2005 | Bacha ..................... H04L 63/10 380/258 |
| 2014/0046906 | A1 * | 2/2014 | Patiejunas ........... G06F 21/6209 707/661 |
| 2016/0070917 | A1 * | 3/2016 | Rozenberg .......... G06F 21/6254 726/26 |
| 2017/0279890 | A1 * | 9/2017 | Borlick .................... H04L 67/51 |
| 2018/0359100 | A1 * | 12/2018 | Gaddam ............... H04L 9/3215 |
| 2019/0342088 | A1 * | 11/2019 | Eidson ...................... H04L 9/14 |

* cited by examiner

*Primary Examiner* — Henry Tsang
(74) *Attorney, Agent, or Firm* — Van Pelt, Yi & James LLP

(57) ABSTRACT

Token generation and management are disclosed, including: generating a token corresponding to a set of user data based at least in part on a token generation policy; storing a mapping between the token and the set of user data; and determining whether to grant a token resolution request associated with the token based at least in part on a token access policy associated with the token and a context parameter associated with the token resolution request.

16 Claims, 13 Drawing Sheets

| Token ID | Token Value | User ID | User Data | Token Access Policy ID | Token Generation Policy ID | Data Attributes |
|---|---|---|---|---|---|---|
| T_1234 | 39g4@gmail.com | U_3241 | bob@gmail.com | AP_jlfa3 | GP_2fCV | ... |
| T_5253 | r8760@poadgie.com | U_9835 | alice@gmail.com | AP_59gdf | GP_08FA | ... |
| T_03sfa | CITY_Gbpqakd | U_215g | Cupertino | AP_aezv3 | GP_1p2o | ... |
| ... | | | | | ... | ... |

Parameters—1002

```
 1 [{
 2   "PreserveValue" : false,
 3   "PreserveChars" : 0,
 4   "FinalLength" : 12
 5 },{
 6   "PreserveValue" : false,
 7   "PreserveCommonValue" : true,
 8   "PreserveChars" : 0,
 9   "FinalLength" : 6,
10 },{
11   "PreserveValue" : true
12 }]
```

Data—1004
jane@gmail.com    1006

Run Test    Save as

Result—1008
kOCJJBnsHWH@gmail.com

FIG. 10A

Parameters — 1002

```
 1  [{
 2    "PreserveValue" : false,
 3    "PreserveChars" : 0,
 4    "FinalLength" : 12
 5  }, {
 6    "PreserveValue" : false,
 7    "PreserveCommonValue" : false,
 8    "PreserveChars" : 0,
 9    "FinalLength" : 8
10  }, {
11    "PreserveValue" : true
12  }]
```

Data — 1004
jane@gmail.com — 1006

[Run Test] [Save as]

Result — 1008
gyT2526myHxC@pouOPH31.com

FIG. 10B

Version

1

Function —1102

```
1  function policy(context, params)
2  {
3    if (context.client.purpose == "marketing")
4    {
5      return true;
6    }
7    return false;
8  }
```

Parameters

1  ""

Context —1104

```
1  // Context changes on a per-resolution basis
2  {
3    "server": {
4      "ip_address": "127.0.0.1",
5      "resolver": {
6        "username": "bob"
7      },
8      "action": "resolve"
9    },
10   "client": {
11     "purpose": "marketing"
12   }
13 }
```

[Run Test] [Save Access Policy]
Result 1106  1108
Access allowed

FIG. 11A

Version

1

Function—1102

```
1  function policy(context, params)
2  {
3      if (context.client.purpose == "marketing")
4      {
5          return true;
6      }
7      return false;
8  }
```

Parameters

1  {}

Context—1104

```
1   // Context changes on a per-resolution basis
2   {
3       "server": {
4           "ip_address": "127.0.0.1",
5           "resolver": {
6               "username": "bob"
7           },
8           "action": "resolve"
9       },
10      "client": {
11          "purpose": "security"
12      }
13  }
```

[Run Test] [Save Access Policy]—1108
Result—1106
Access denied

FIG. 11B

TOKEN GENERATION AND MANAGEMENT

CROSS REFERENCE TO OTHER APPLICATIONS

This application claims priority to U.S. Provisional Patent Application No. 63/320,545 entitled TOKENIZING USER INFORMATION filed Mar. 16, 2022 which is incorporated herein by reference for all purposes.

BACKGROUND OF THE INVENTION

In the field of data security, tokenization is used to substitute data (e.g., of a sensitive nature) with non-sensitive data, which is referred to as a "token." The token can then be used for analytics or other purposes in place of the substituted data, to remove the risk of having the substituted data becoming undesirably exploited or exposed to unintended parties.

However, conventional tokenization techniques often produce tokens with a static format, and potentially one that does not match the format of the input data. Furthermore, the conventional process of detokenizing or retrieving the substituted data corresponding to a token is inflexible. For example, typically, detokenizing a particular token is statically permitted for a first type of system but denied for a second type of system. It would be desirable to generate and manage data security tokens with customization and flexibility for different uses of tokens.

BRIEF DESCRIPTION OF THE DRAWINGS

Various embodiments of the invention are disclosed in the following detailed description and the accompanying drawings.

FIG. 4 is a diagram showing example entries of a token store in accordance with some embodiments.

FIG. 10A is a diagram showing an example user interface that is configured to enable configuration and testing of a token generation policy at design time.

FIG. 10B is a diagram showing another example user interface that is configured to enable configuration and testing of a token generation policy at design time.

FIG. 11A is a diagram showing an example user interface that is configured to enable configuration and testing of a token access policy at design time.

FIG. 11B is a diagram showing another example user interface that is configured to enable configuration and testing of a token access policy at design time.

DETAILED DESCRIPTION

Figure 1:
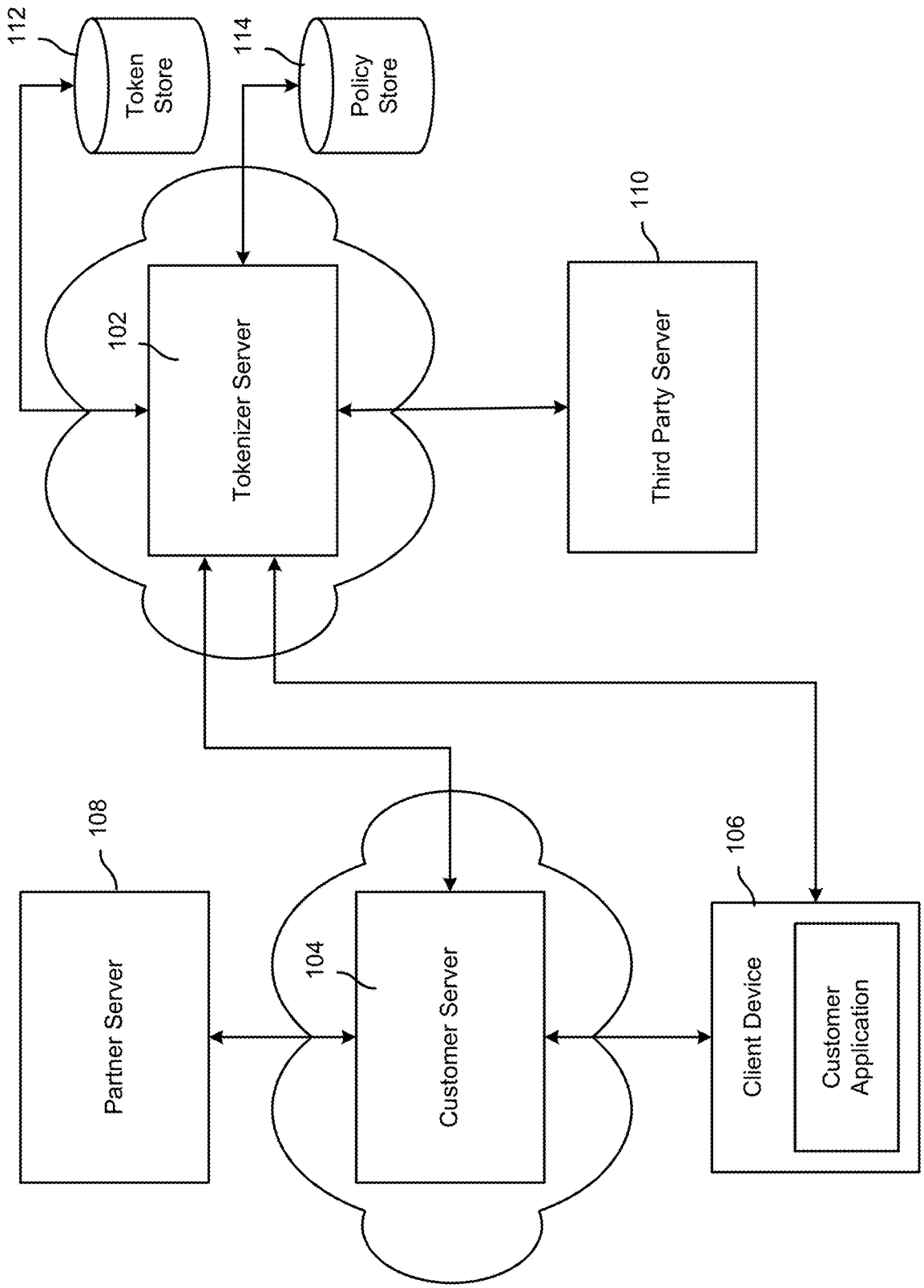
FIG. 1 is a diagram showing an embodiment of a system for token generation and management.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of token generation and management are described herein. A token corresponding to a set of user data is generated based at least in part on a "token generation policy." For example, the token generation policy can be selected by the requestor of a tokenization request, or a data type (e.g., email, phone number, address, zip code) can be programmatically detected from the set of user data and then the token generation policy corresponding to that detected data type is selected. In some embodiments, the token generation policy can be configured to prescribe how the resulting token should appear. In various embodiments, the token generation policy includes parameters that are used to determine how a token is to be generated from an input set of user data. A mapping between the token and the set of user data is stored. In some embodiments, an entry that associates the input set of user data and the resulting token is stored in a token store. In some embodiments, the token store is distributed across various geographic locations (e.g., countries) and the entry could be stored in an instance of the token store that is located in a specified geographic location. In some embodiments, in the event that attributes associated with the set of user data were passed in with the token generation request, those attributes can also be stored in the entry that associates the token with the set of user data. In various embodiments, the generated token is associated with a "token access policy." In various embodiments, the token access policy includes parameters that describe conditions for granting a token resolution request, which is a request to obtain/resolve the set of user data that corresponds to a given token. For example, the token access policy could dictate one or more of the following parameters: a requestor role that is permitted to resolve the token, a location of the requestor from which the requestor is permitted to resolve the token, a specified relationship between the requestor and a specified principal associated with the set of user data for whom the requestor is permitted to resolve the token, and how/if all the set of user data associated with the token should be transformed on resolution. Whether to grant a token resolution request associated with the token is determined based at least in part on a token access policy associated with the token and a context parameter associated with the token resolution request. In various embodiments, the token access policy that is associated with the token that is identified by the token resolution request was associated with the token at the time of its generation. In various embodiments, the token resolution request includes request parameters that are included in the request by the requestor, such as, for example, identifying information associated with the token. In contrast, a "context parameter" associated with the token resolution request is a parameter that is not included in the request by the requestor and is also a parameter that cannot be modified by the requestor. Instead, the context parameter can be dynamically determined by performing one or more network calls to the server that had sent the token resolution request and/or a third party server. Put another way, a "context parameter" provides a context in which the token resolution request is made and is not mutable by the requestor. The combination of the request parameters (that are included in the token resolution request) and the context parameter(s) that have been determined for the token resolution request is evaluated using the token access policy to determine whether the token resolution request is to be granted. In the event that the token resolution request is granted, the set of user data is located in the token store and returned to the requestor. Otherwise, in the event that the token resolution request is denied, an access denial message is returned.

FIG. 1 is a diagram showing an embodiment of a system for token generation and management.

Customer server 104 comprises a server (e.g., that is hosted in a cloud) that is configured to perform a service by exchanging data with client devices, such as client device 106, each of which executes a software application ("customer application") that is configured to communicate with customer server 104. An example of a client device can be a desktop computer, a laptop computer, a mobile device, a tablet device, or any type of computing device. End users use the service provided by customer server 104 through interacting with the customer application that is executing on their respective client devices. In the course of providing relevant and/or customized service to end users, customer server 104 may be configured to obtain user data from the end users via the client devices. For example, an end user may be invited to create an account with the service that is provided by customer server 104 and in response, submits the requested user data such as his or her name, address, email, and phone number via the customer application executing at his or her client device. Due to the sensitive nature (e.g., the data can be used to personally identify an individual) of at least a portion of the user data that is obtained from an end user, customer server 104 may want to tokenize each piece of such data. Because tokens are themselves not sensitive data (e.g., they cannot be used to personally identify the end user for whom the user data was replaced with tokens) and are not valuable to internal or external attackers, customer server 104 can replace at least a portion of the user data that it receives from end users into tokens to protect the privacy of its end users and ensure the data security of this sensitive user data in the event of a data breach.

In response to receiving a set of user data that is input by an end user, the customer application executing at client device 106 is configured to send a corresponding token generation request to tokenizer server 102 over a network. The token generation request includes at least the set of user data and a token generation policy (or a reference to a token generation policy). In some embodiments, the token generation request may also include a token access policy (or a reference to a token access policy). In some embodiments, the token generation request may optionally include a set of attributes (e.g., data type, path, project reference number) associated with the set of user data. In some embodiments, the customer application executing at client device 106 generates the token generation request using a software development kit that is provided by tokenizer server 102 and where the token generation request comprises a call via an application programming interface (API) that is also provided by tokenizer server 102. In some other embodiments, instead of generating and sending the token generation request corresponding to the set of user data to tokenizer server 102 directly, client device 106 is configured to send the set of user data to customer server 104 and in response, customer server 104 is configured to generate and send the token generation request to tokenizer server 102 over a network.

In response to receiving a token generation request from either client device 106 or customer server 104, tokenizer server 102 is configured to generate a corresponding token based on the set of user data (or a reference to the set of user data) that was included in the token generation request and an identified token generation policy (e.g., that is stored at policy store 114). As shown in FIG. 1, tokenizer server 102 is configured to access policy store 114, which is configured to store policies such as token generation policies and token access policies. In some embodiments, the token generation policies and token access policies that are stored at policy store 114 can be pre-generated by a party operating tokenizer server 102 and/or such policies can be generated by a party operating a customer server such as customer server 104. To generate the requested token, tokenizer server 102 is configured to obtain (e.g., from policy store 114) the token generation policy that was identified by the token generation request and then construct a token value corresponding to the set of user data in accordance with the parameters of the identified token generation policy. For example, the token generation policy could dictate one or more of the following parameters: how to generate a token for a given input set of user data, whether to preserve at least a portion of the input set of user data in the token, whether/how to validate the input set of user data, whether to add a specified string in the token, whether the token should have the same format as the input set of user data, where (e.g., in which geographical location) to store the set of user data, and a specified length of at least a component of the token. After generating the token value, tokenizer server 102 is configured to add a new entry in token store 112 that associates the set of user data with the token value. In some embodiments, each entry in token store 112 includes one or more of the following: a set of user data (or a reference thereof) associated with an end user of customer server 104, a token value, a token ID, a tokenizer user identifier (ID) (e.g., that is assigned by tokenizer server 102 to the end user), identifying information of a relevant token generation policy, identifying information of a relevant token access policy, and a set of attributes associated with the set of user data. As will be described in further detail below, token store 112 can be implemented as a distributed store with different instances of token store 112 being physically located in different geographical locations. In the event that the relevant token generation policy specified to store the set of user data in a particular geographical location (e.g., for legal compliance), tokenizer server 102 is configured to store the entry in the instance of the distributed token store that is physically located in the specified geographical location. After generating and storing the token along with the set of user data that it represents, tokenizer server 102 is configured to send the token to the requestor over a network, which is either customer server 104 or client device 106.

Customer server 104 is configured to receive the token corresponding to the set of user data directly from tokenizer server 102 or indirectly from client device 106, which had received the token from tokenizer server 102. In various embodiments, customer server 104 is configured to store a mapping (e.g., an entry in a database that is not shown in FIG. 1) that associates a customer user identifier (e.g., that is assigned by customer server 104 to the end user) with the token. Customer server 104 may or may not also store a copy of the set of user data for which a token was requested to be generated. For example, customer server 104 could avoid storing a set of user data to avoid the risk of this sensitive data becoming leaked for which a token was generated given that a copy of the set of user data is maintained by tokenizer server 102. By not locally storing a copy of the set of user data, even an attack on customer server 104 that results in a leak of customer user identifiers and corresponding tokens would not be valuable for the attackers since the attackers will not be able to resolve the tokens to obtain the sets of user data that have been replaced by the tokens.

In addition to locally using the tokens customer server 104 has requested and received from tokenizer server 102, customer server 104 can also share the tokens with partner server 108 over a network. For example, partner server 108 is configured to perform a service on behalf of the service associated with customer server 104 such as analytics. Tokens could be generated to serve as substitutes of sensitive user data but are themselves not sensitive user data. Also, as will be described in further detail below, customer server 104 can freely share the tokens with partner services (e.g., provided by partner server 108) for the partner services to perform statistical analysis on the tokens without concern of exposing sensitive user data. Furthermore, because the tokens themselves are not sensitive user data, customer server 104 can also send copies of the tokens from one geographic location to another without violating any legal restrictions on the migration of certain user data.

To obtain the set of user data that corresponds to a token, customer server 104 (or another requestor) is configured to resolve the token by sending a token resolution request to tokenizer server 102 over a network. Because the set of user data that is represented by a token cannot be derived from the value of the token, the set of user data can only be retrieved from tokenizer server 102. For example, customer server 104 may want to present one or more sets of user data associated with an end user back to the end user at client device 106 to provide the end user the opportunity to verify that this information is still current. The token resolution request that is generated by customer server 104 (or another requestor) includes one or more request parameters that are specified/input by the requestor, including identifying information of the token (e.g., either the token ID or the token value).

In response to receiving the token resolution request from customer server 104, tokenizer server 102 is configured to determine one or more context parameters corresponding to the token resolution request and in contrast to the request parameters, the context parameters are not specified or modifiable by the requestor. Instead, tokenizer server 102 is configured to dynamically determine context parameters corresponding to the token resolution request by making one or more network calls to destinations, such as third-party server 110, over a network. Example context parameters include the source IP address (which can be used to determine a source location of the token resolution request), a time of day at which the token resolution request was sent, and/or a role of a user from which the request originated. Tokenizer server 102 is configured to obtain the token access policy associated with the token that is identified in the token resolution request and input both the request parameters and context parameters into the obtained token access policy. The token access policy will then determine whether the request is granted based on the input parameters and so the set of user data corresponding to the token is to be returned to the requestor, or whether the request is denied and so the set of user data corresponding to the token is not to be returned to the requestor.

When deletion of a token or the set of user data that is represented by the token is desired to be deleted (so that the set of user data can no longer be obtained through sending a token resolution request corresponding to the token to tokenizer server 102), a requestor can send a token deletion request to tokenizer server 102 over a network. For example, for an end user who has deleted their account with the service provided by customer server 104, customer server 104 can send to tokenizer server 102 a token deletion request corresponding to each set of user data for which a token had been previously generated. In response to receiving the token deletion request, tokenizer server 102 is configured to locate any entries in token store 112 that include tokens or user data that match the parameters provided in the token deletion request and either delete them immediately or associate the entries with a predetermined post deletion token policy in place of their previously stored token access policies. The consequence of deleting the entries or associating them with a predetermined deletion token policy is that the affected tokens can no longer be resolved by tokenizer server 102 (e.g., the tokenizer server 102 will not return the set of user data for a token that is not stored in an entry in the token store or is associated with the deletion token policy) and that their corresponding sets of user data are effectively deleted (e.g., in a central manner at tokenizer server 102 if copies of the user data are not stored elsewhere).

As illustrated in FIG. 1, tokenizer server 102 can be leveraged to generate, maintain, and manage tokens that represent user data. In various embodiments, tokenizer server 102 is configured to make sure that data sets are safe for sharing with external or internal parties, make data sets less valuable when compromised by hackers, and eliminate risk of compliance mistakes with respect to user privacy or data misuse. Tokenizer server 102 generates, stores, manages, and resolves tokens linked to either a data value or a reference to a data value. The tokens can then replace the original data value in the data set until the tokens are needed to be resolved (e.g., the original data values are needed again).

Figure 2:
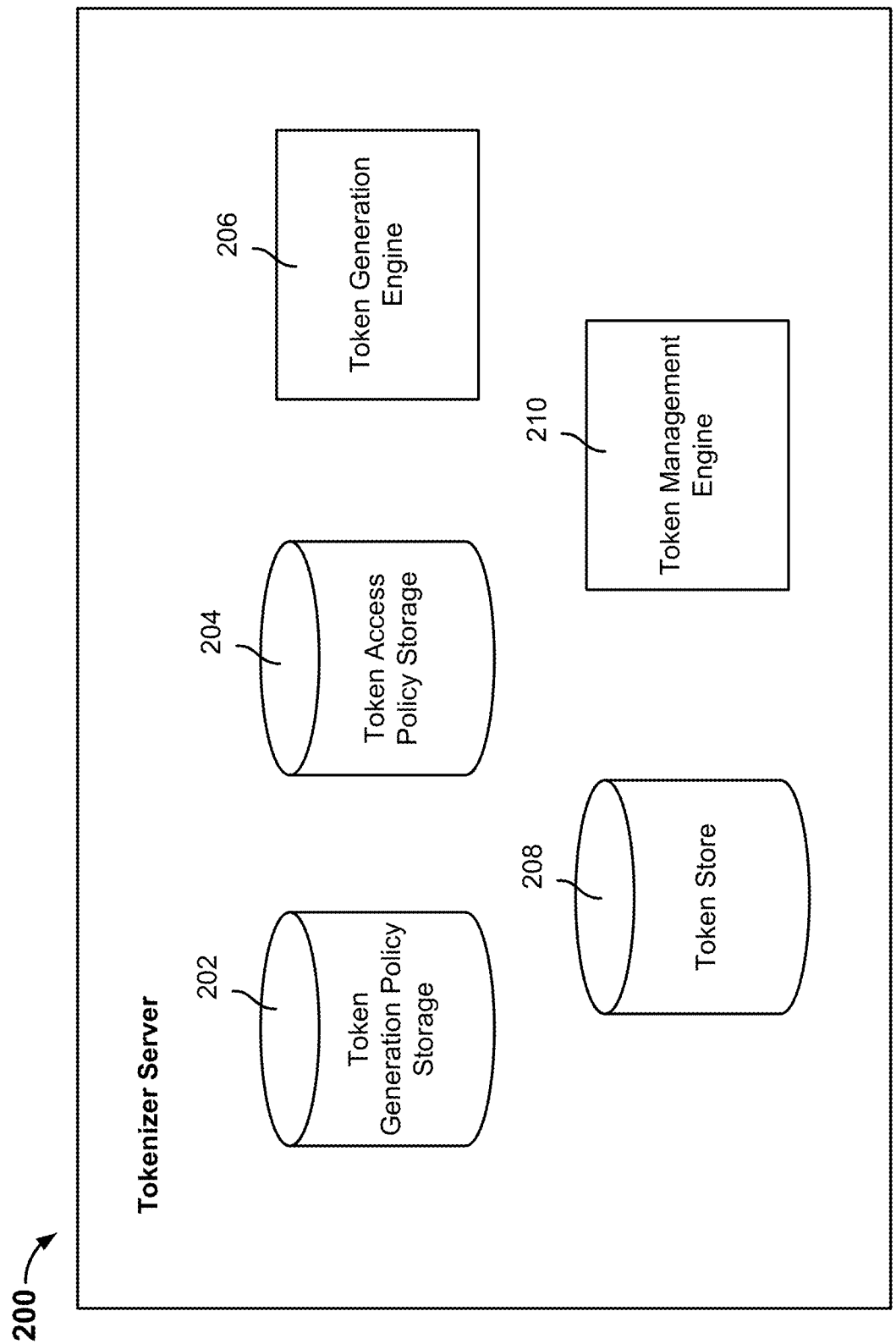
FIG. 2 is a diagram showing an example of a tokenizer server in accordance with some embodiments.

FIG. 2 is a diagram showing an example of a tokenizer server in accordance with some embodiments. In the example of FIG. 2, the tokenizer server includes token generation policy storage 202, token access policy storage 204, token generation engine 206, token store 208, and token management engine 210. In some embodiments, each of token generation policy storage 202, token access policy storage 204, token generation engine 206, token store 208, and token management engine 210 can be implemented with one or both of software and hardware.

Token generation policy storage 202 is configured to store token generation policies. As mentioned above, a token generation policy describes the format, properties, and privacy preserving strength for the token that should be generated. Also, as mentioned above, a token generation policy could dictate one or more of the following parameters: how to generate a token for a given input set of user data, whether to preserve at least a portion of the input set of user data in the token, whether/how to validate the input set of user data, whether to add a specified string in the token, whether the token should have the same format as the input set of user data, where (e.g., in which geographical location) to store the set of user data, and a specified length of at least a component of the token. In a first example, a token generation policy could indicate to preserve the format of the input set of user data and/or a component of the user data. For instance, if the set of user data were an email, then the token generation policy could specify to preserve the format of an email such that the resulting token has the following format: "[value1]@[value2].com" (and where "value1" and "value2" are generated based on another parameter of the token generation policy). By preserving the format of the input set of user data, tokens could be used in place of user data in existing data processing pipelines by the requesting entity that has already been configured to recognize a given format. In a second example, a token generation policy could indicate to add a predetermined value to a location within the token. For instance, a token generation policy could indicate to add "GUID" as a prefix to a resulting token. Adding a predetermined value (e.g., as a prefix or a suffix) to a token could allow the tokens to be sorted and organized by the predetermined values when the token values themselves are not intended to be meaningful for the purpose of data security/privacy.

In some embodiments, different token generation policies could be specifically configured for different data types such as, for example, social security numbers, phone numbers, emails, addresses, zip codes, country codes, credit card numbers, and tax payer ID numbers. In some embodiments, when a token generation policy is associated with a particular data type, the policy may also include validations rules to verify that the input user data complies with the expected format of that data type.

In some embodiments, at least some token generation policies stored at token generation policy storage 202 are configured and submitted by customers of the tokenization service. Therefore, a customer of the tokenization service can customize the parameters of a token generation policy, such as those described above. In some embodiments, at least some token generation policies stored at token generation policy storage 202 are configured by administrators of the tokenization service. Over time, new token generation policies can be added to token generation policy storage 202, while existing token generation policies at token generation policy storage 202 can be deleted. Furthermore, token generation policies stored at token generation policy storage 202 can be reused across as many tokens as desired.

Token access policy storage 204 is configured to store token access policies. As mentioned above, a token access policy describes who can resolve the token, where or what context in which the token can be resolved, for what purpose can the token be resolved, and how if all the data backing the token should be transformed on resolution. For example, the token access policy could dictate one or more of the following parameters: a requestor role that is permitted to resolve the token, a location of the requestor from which the requestor is permitted to resolve the token, a time of day to permit a request to resolve the token, a specified relationship between the requestor and a specified principal associated with the set of user data for whom the requestor is permitted to resolve the token, and how/if all the set of user data associated with the token should be transformed on resolution. In a first example, a token access policy could indicate to only allow requestors that are sending token resolution requests from the United States to resolve the token (e.g., be granted access to the set of user data that is backing the token). In a second example, a token access policy could indicate to only allow a requestor that is requesting to resolve the token for the stated purpose of customer support between the hours of 8am to 5pm Eastern time to resolve the token. In a third example, a token access policy could indicate to only allow a requestor (e.g., a customer support agent) that is indicated as being authorized by a third party service to view/access a set of user data associated with a principal (e.g., an individual that is requesting customer support) to resolve the token that is backed by that user data. In some embodiments, some parameters that are specified by a token access policy could be derived directly from a token resolution request and some other parameters that are specified by a token access policy could not be derived directly from the request but need to be derived by making a network call (e.g., an API request or other type of call) to a third party service.

In some embodiments, different access policies could be specifically configured for different use types such as, for example, security, marketing, data integrity, auditing, and post deletion.

In some embodiments, at least some token access policies stored at token access policy storage 204 are configured and submitted by customers of the tokenization service. Therefore, a customer of the tokenization service can customize the parameters of a token access policy, such as those described above. In some embodiments, at least some token access policies stored at token access policy storage 204 are configured by administrators of the tokenization service. Over time, new token access policies can be added to token access policy storage 204, while existing token access policies at token access policy storage 204 can be deleted. Furthermore, token access policies stored at token access policy storage 204 can be reused across as many tokens as desired.

Token generation engine 206 is configured to generate tokens in response to token generation requests. In some embodiments, a token generation request that is received at token generation engine 206 includes at least the following arguments: a set of user data (or a reference to a set of user data), identifying information associated with a token generation policy, identifying information associated with a token access policy, and (optionally) a set of attributes associated with the set of user data. For example, the set of user data comprises sensitive user data such as one of a social security number, phone number, email, address, zip code, country code, credit card number, and tax payer ID number. The token generation policy that is identified (e.g., by a corresponding token generation policy ID) in the token generation request is obtained from token generation policy storage 202 and used by token generation engine 206 to generate the token. Token generation engine 206 is then configured to store a new entry in token store 208 that includes at least the following: the token (e.g., the token value and the token ID), the set of user data (or the reference thereof), identifying information associated with a token generation policy, identifying information associated with a token access policy, and the set of attributes (if available). The set of attributes that may be passed in the token generation request includes attributes of the set of user data that are optionally shared by the requestor of the token generation requestor. Examples of such attributes include: a data type of the set of user data, a customer assigned user ID associated with the set of user data, a file path to the set of user data at a storage associated with the requestor, and an identifier associated with a study or project for which the token was generated. As will be described in further detail below, the attributes that are stored in token store entries can be returned in response to a request to examine a token and/or used to identify relevant entries to delete from token store 208 in response to a request to delete tokens. In some embodiments, for each entry in token store 208, token generation engine 206 can also store other fields such as a tokenizer assigned user ID, the token creation time, and a token expiration time (which could be specified in the token generation policy or the token generation request). After generating the token in response to the token generation request, token generation engine 206 is configured to return the token to the requestor.

In some embodiments, token store 208 comprises a centralized storage. In various embodiments, token store 208 comprises a distributed storage such that different instances of token store 208 are physically located in different geographical locations (e.g., different countries and/or different cities within a country). Where token store 208 is distributed, in some embodiments, token generation engine 206 is configured to select a particular instance of token store 208 that is associated with a corresponding geographical location at which to store an entry that includes a generated token. The particular instance of token store 208 that is associated with a corresponding geographical location at which to store an entry that includes a generated token can be determined based on a location specified in the token generation policy and/or the token generation request. For example, laws may require the user data that is obtained by a customer of the tokenizer service to be stored in a particular country and so such data for which tokens are to be generated would need to be stored in accordance with such geographic restrictions. If no location is specified in the token generation policy and/or the token generation request, then token generation engine 206 is configured to store the entry in an instance of token store 208 that is closest to the location from which the token generation request was received, for example.

Token management engine 210 is configured to process requests associated with generated tokens (e.g., for which entries are stored at token store 208). In some embodiments, token management engine 210 is configured to look up the previously generated token for a set of user data in response to a request to look up a token. For example, a token lookup request includes at least the argument of the set of user data, which token management engine 210 is configured to use to look up an entry in token store 208 that includes the set of user data. Where token store 208 is distributed, token management engine 210 could start the search at an instance of token store 208 that is geographically closest to a location hint that is provided by the requestor of the request, for example. When the relevant entry is located, token management engine 210 is configured to return the token that is included in that relevant entry.

In some embodiments, token management engine 210 is configured to return metadata about a token and/or the relevant token access policies in response to a request to examine the token. For example, an examine token request includes identifying information associated with a token (e.g., a token value or a token ID), which token management engine 210 is configured to use to look up an entry in token store 208 that includes the identified token. Where token store 208 is distributed, token management engine 210 could start the search at an instance of token store 208 that is geographically closest to a location hint that is provided by the requestor of the request, for example. When the relevant entry is located, token management engine 210 is configured to return the set of attributes and/or information related to the token access policy that are included in that relevant entry.

In some embodiments, token management engine 210 is configured to return the set of user data that backs a token in response to a token resolution request associated with the token. For example, a token resolution request includes identifying information associated with a token (e.g., a token value or a token ID) and request parameters that are provided by the requestor. Examples of request parameters include a stated purpose for the request, an authorization token, and a user identifier of an individual that had originated the request. In response to receiving the token resolution request, token management engine 210 is configured to generate one or more context parameters associated with the request. Unlike the request parameters that are provided by the requestor and could be passed as arguments in the token resolution request, context parameters are not provided by and cannot be modified by the requestor. In some embodiments, context parameters can be dynamic and therefore, different instances of a token resolution request for the same token may be associated with different context parameters depending on when and from whom the requests were issued. In some embodiments, token management engine 210 could obtain context parameter(s) by querying a third-party server (e.g., based on a request parameter). For example, the third-party server could be an authorization server that manages roles and/or permissions of identities/individuals that token management engine 210 is configured to query using an authorization token/identity that is included in the token resolution request to determine a context parameter comprising the role or set of permissions that are associated with the authorization token/identity. For example, the token resolution request comes with data (e.g., the data is provided by the requestor that is signed by a private key) that proves the identity of Bob as the requestor. Token management engine 210 then queries the authorization server and determines that Bob is an engineer with administrative permissions and includes that in the context parameters. Other example context parameters that could be determined by token management engine 210 include the time of day at which the request was received, the Internet Protocol (IP) address from which the request was sent, and/or a location from which the request originated. Token management engine 210 is configured to look up an entry in token store 208 that includes the identified token. Where token store 208 is distributed, token management engine 210 could start the search at an instance of token store 208 that is geographically closest to a location hint that is provided by the requestor of the request, for example. When the relevant entry is located, token management engine 210 is configured to determine the token access policy that is included in that relevant entry. Then, token management engine 210 is configured to evaluate the combination of the request parameters and the determined context parameters against that token access policy to determine whether the policy prescribes to grant or deny the token resolution request. In the event that the token access policy grants the request based on its request parameters and context parameters, then token management engine 210 is configured to return the set of user data in the found entry and/or first transform the set of user data prior to returning it to the requestor as described in the token access policy. Transforming the set of user data includes to inject noise into the set of user data and/or obfuscate at least a specified portion of the set of user data.

In some embodiments, token management engine 210 is configured to delete relevant token store entries in response to a token deletion request associated with one or more tokens. For example, a token resolution request includes identifying information associated with one or more tokens (e.g., at least a portion of a token value or at least a portion of a token ID) or one or more attributes (e.g., a data type, a path, an ID of a project or study). In response to receiving the token deletion request, token management engine 210 is configured to look up one or more entries in token store 208 that include the identified token(s) and/or attribute(s). Where token store 208 is distributed, token management engine 210 could start the search at an instance of token store 208 that is geographically closest to a location hint that is provided by the requestor of the request, for example. When the relevant entr(ies) are located, token management engine 210 is configured to delete the entries from token store 208 or update the token access policies in those entries to be a predetermined post deletion access policy. For a token for which the relevant entry in token store 208 is deleted or for which its token access policy is updated to the post deletion access policy, token management engine 210 is configured to return a token not found message in response to subsequent token resolution requests that match that token. Associating a "deleted" token with a post deletion access policy (instead of deleting its token store entry immediately) could allow the entry to persist for a period of time to comply with retention requirements and/or provide opportunities for fraud detection. The post deletion access policy may also indicate an expiration date for the entry, after which the entry is to be garbage collected (e.g., removed from token store 208).

In some embodiments, prior to using the tokenizer server, the application developer can complete the following example steps in a setup process:
1. Create an account on a specified website (e.g., www.userclouds/console) and get authentication information (e.g., API keys to authenticate themselves to the tokenizer server).
2. Configure the data center locations (e.g., the locations of sources of requests related to token generation and token management) across the world where it is desired to use the system's tokenizing service and set the rough daily call volume so that appropriate capacity can be generated.

Figure 3:
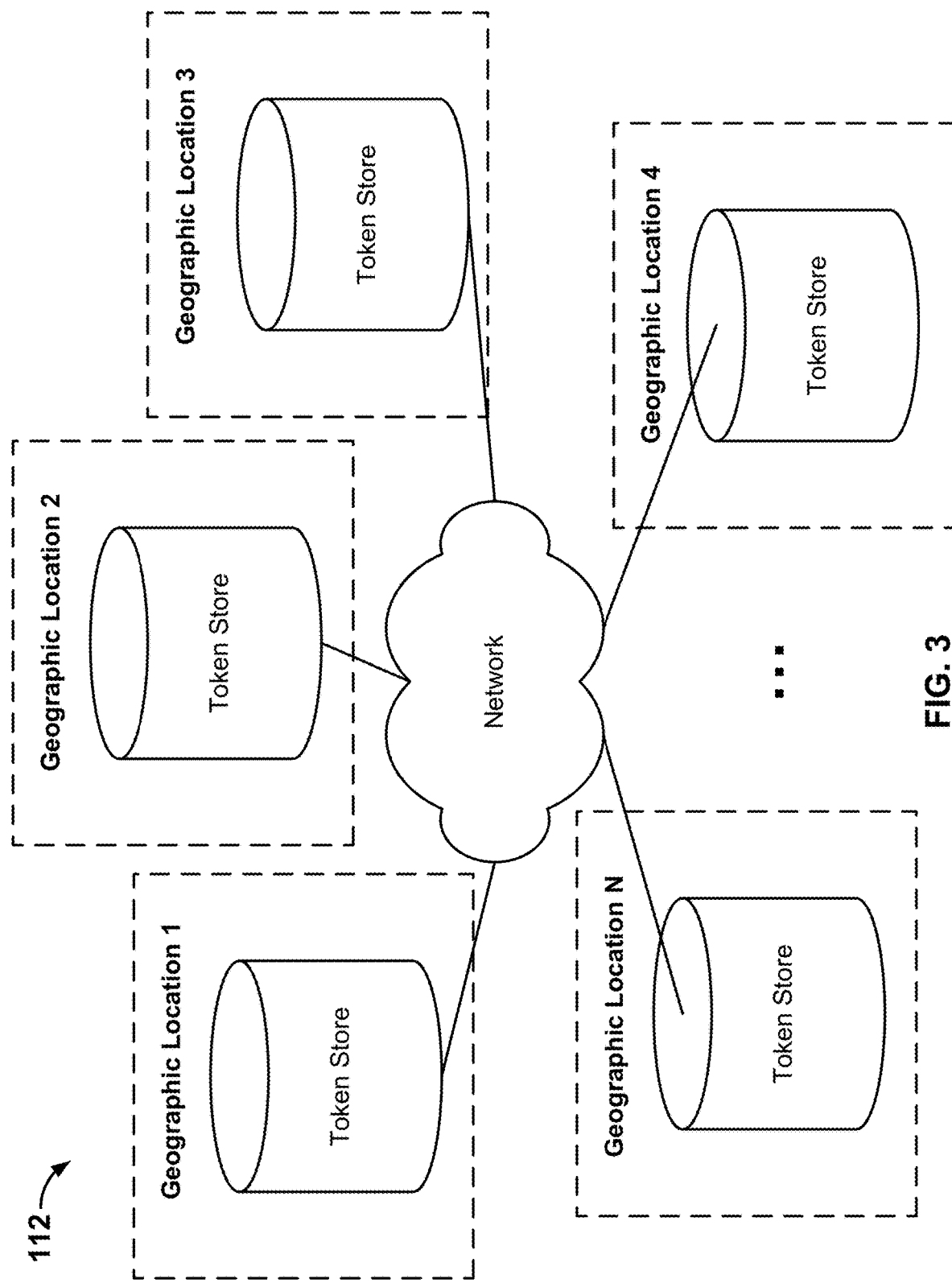
FIG. 3 is a diagram showing an example of a distributed token store in accordance with some embodiments.

FIG. 3 is a diagram showing an example of a distributed token store in accordance with some embodiments. In some embodiments, token store 112 of FIG. 1 can be implemented using the example of a distributed token store that is shown in FIG. 2. As shown in FIG. 3, the distributed token store comprises N number of instances of token stores that are located in different physical geographic locations and connected by a network, where N is a value greater than zero. For example, the N geographic locations could be spread across different countries and/or across different cities in one or more countries. One advantage to using a distributed token store is that requests for tokens may originate in different geographic locations and those requests could be processed faster if the relevant user data or token could be handled at a proximate instance of the token store. Another advantage to using a distributed token store is that different jurisdictions may have different legal requirements on where user data should be stored and so a token generation policy can select a particular geographic location in which to store a generated token. If that user data needs to be evaluated or analyzed at a server that is outside of its legally compliant location, then the token that is backed by that user data can be transferred out of the token store that is located in the legally compliant location and used in place of the user data in the evaluation/analyses. As such, a distributed token store such as the example shown in FIG. 3 provides efficient and flexible storage options for tokens and user data.

FIG. 4 is a diagram showing example entries of a token store in accordance with some embodiments. In the example of FIG. 4, each entry of the token store includes the fields of token ID, token value (which is what is also sometimes referred to simply as "token"), user ID (that is assigned by the tokenizer server), user data (the sensitive user data that backs the token value), token access policy ID, token generation policy ID, and data attributes. For example, in entry 402, the input user data was "bob@gmail.com" and for which the token value of "39g4@gmail.com" was generated based on token generation policy ID "GP_2fCV." In the example of entry 402, token generation policy ID "GP_2fCV" had indicated to preserve the email format and also the domain name of the input user data comprising an email and as such, the resulting token has an email format and also the preserved domain name of the input user data. If entry 402 matches a token resolution request, then the user data of "bob@gmail.com" would only be returned to the requestor if the combination of request parameters and context parameters of the token resolution request meets the conditions described in token access policy ID "AP_jlfa3." If entry 402 matches a token lookup request, then the token value can be returned. If entry 402 matches a token examination request, then token generation policy ID "GP_2fCV," "token access policy ID "AP_jlfa3," and its data attribute values (if any) could be returned for example. If entry 402 matches a token deletion request, then entry 402 could be removed from the token store or alternatively, its token access policy ID could be updated to be a post deletion access policy that would only grant token resolution requests with a limited range of purposes (e.g., only fraud detection) and includes an expiration date after which entry 402 would be removed from the token store.

Figure 5:
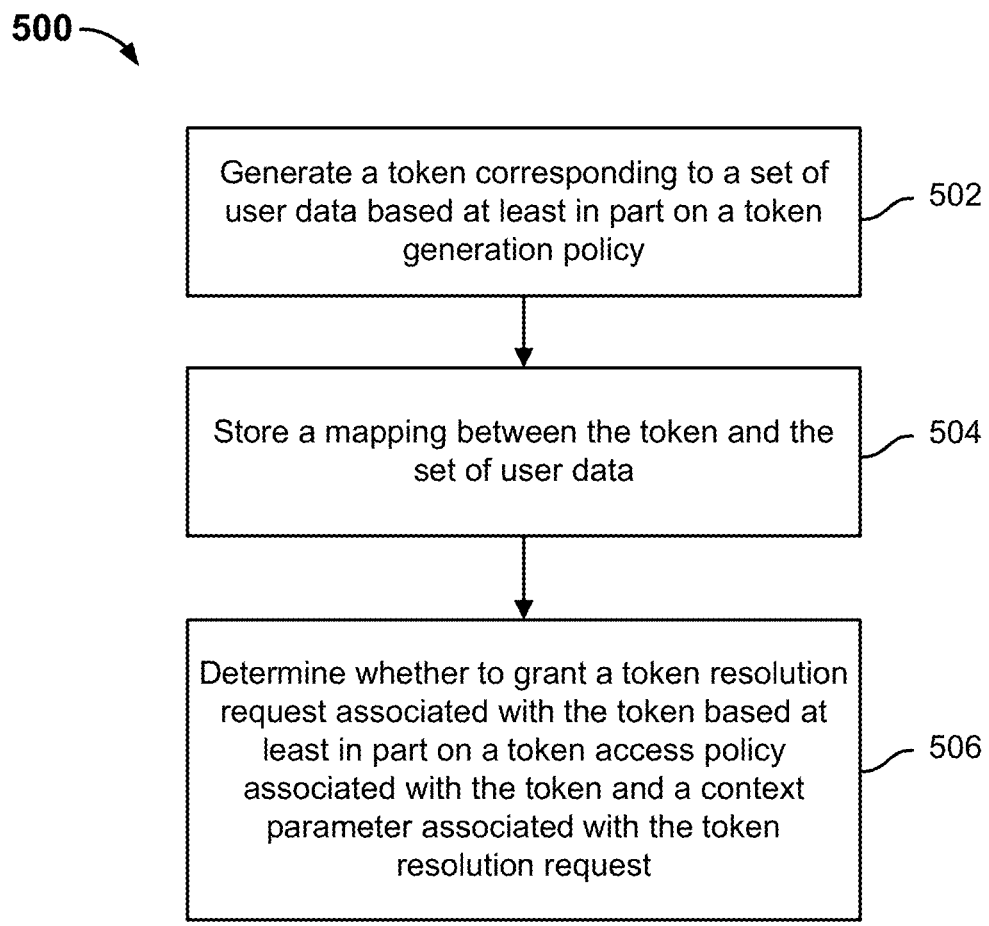
FIG. 5 is a flow diagram showing an embodiment of a process for token generation and management.

FIG. 5 is a flow diagram showing an embodiment of a process for token generation and management. In some embodiments, process 500 is implemented at tokenizer server 102 of FIG. 1.

At 502, a token corresponding to a set of user data is generated based at least in part on a token generation policy. A token is generated for a set of user data that is included in a token generation request based on the parameters described in a token generation policy that is identified by the token generation request. In various embodiments, the set of user data comprises sensitive user data for which the token is desired to be generated so that the token can be used in its place to reduce the risk from a potential data breach event.

At 504, a mapping between the token and the set of user data is stored. An entry that relates the token and at least the set of user data is stored in a token store.

At 506, whether to grant a token resolution request associated with the token is determined based at least in part on a token access policy associated with the token and a context parameter associated with the token resolution request. The token resolution request includes identifying information associated with the token and requests to obtain the set of user data that backs the token. The token resolution request could be received from the same party that had requested to generate the token or from a different party. The token resolution request may include one or more request parameters that are provided by the requesting party as arguments in the token resolution request. An example of a request parameter is a specified purpose (e.g., marketing, security, customer support) for the set of user data. In contrast to the request parameter, which can be modified by the requesting party, a context parameter associated with the token resolution request is not passed as an argument to the request and also cannot be modified by the requesting party. A context parameter can be derived from the metadata associated with the token resolution request or determined through a network call (e.g., an API call) to a third party service. The combination of the request parameter(s) and the context parameter(s) is evaluated against the token access policy that is associated with the token to determine whether the combination of the parameters meets the token access policy's conditions for resolving the token, which results in the returning of the set of user data.

Figure 6:
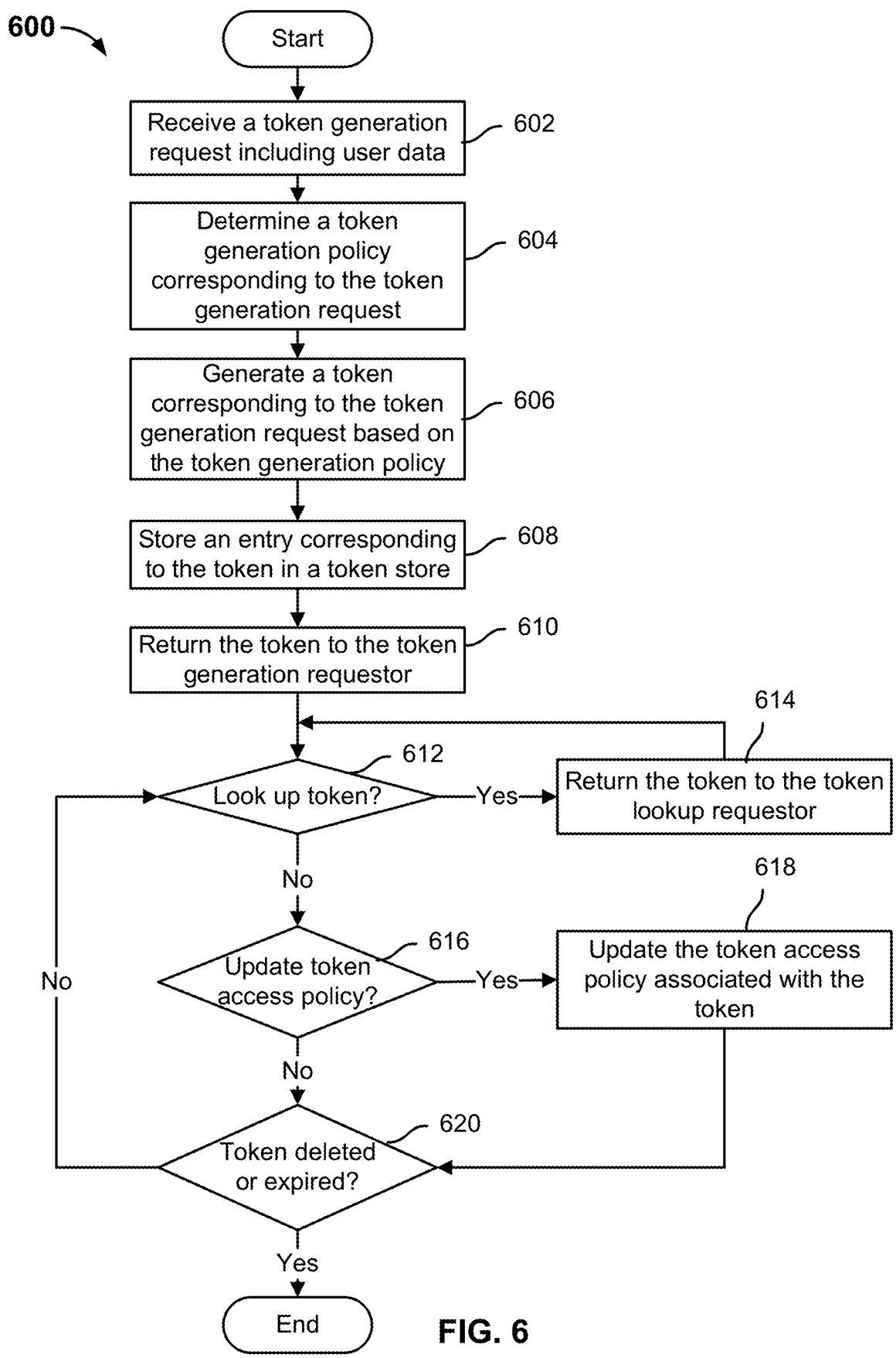
FIG. 6 is a flow diagram showing an example of a process for generating tokens in accordance with some embodiments.

FIG. 6 is a flow diagram showing an example of a process for generating tokens in accordance with some embodiments. In some embodiments, process 600 is implemented by tokenizer server 102 of FIG. 1. Steps 502 and 504 of process 500 of FIG. 5 may be implemented, at least in part, using process 600.

At 602, a token generation request including user data is received. The token generation request includes a set of user data for which a token is to be generated.

At 604, a token generation policy corresponding to the token generation request is determined. In some embodiments, the token generation request includes identifying information associated with a token generation policy to use to generate the token. In some embodiments, the token generation policy is not identified in the request but is associated with the particular requestor of the token generation request.

At 606, a token corresponding to the token generation request is generated based on the token generation policy. The token is generated in accordance with the token generation policy. The generated token may preserve the format of the set of user data or preserve at least a portion/component of the set of user data, depending on the parameters specified in the token generation policy. The generated token could also inject a human or computer readable/meaningful predetermined value, depending on the parameters specified in the token generation policy. In various embodiments, the set of user data cannot be recovered/derived from the token and the set of user data can only be recovered if a token resolution request that includes that token is granted.

At 608, an entry corresponding to the token is stored in a token store. The entry that includes at least a mapping between the set of user data and the token (e.g., both the token ID and the token value) is stored in a token store. In some embodiments, the entry may further include one or more of the following: identifying information associated with the token generation policy, identifying information associated with the token access policy (e.g., which is included in the token generation request or elsewhere), a creation time, a user ID (e.g., that is assigned by the tokenizer server), and a set of attributes associated with the user data (e.g., which are included in the token generation request). In some embodiments, if the token store is distributed, then the entry can be stored in an instance of the token store that is located in a selected physical location. For example, the physical location can be selected based on a location identified in the token generation policy. In another example, the physical location can be selected based on its proximity to the location from which the token generation request was received.

At 610, the token is returned to the token generation requestor.

At 612, whether the token is to be looked up from the token store is determined. In the event that the token is to be looked up from the token store, control is transferred to 614. Otherwise, in the event that the token is not to be looked up from the token store, control is transferred to 616. After the token is generated, a token lookup request for the token can be received. The lookup request includes at least the set of user data which backs the token.

At 614, the token is returned to the token lookup requestor. The token store is searched for an entry that includes the set of user data that is included in the token lookup request. In some embodiments, if the token store is distributed, then an instance of the token store that is located in a physical location that is specified as the storage location by the token generation policy is first searched before the other instances of the token for the relevant entry. If the token generation policy does not specify a location in which to store the token, then the instance of the token store that is closest to the location of the token generation request is first searched for the entry. Once the relevant entry is found, the token that is included in the entry is returned to the requestor of the token lookup request.

At 616, whether a token access policy associated with the token is updated is determined. In the event that the token access policy is updated, control is transferred to 618. Otherwise, in the event that the token access policy is not updated, control is transferred to 620. In some embodiments, the token access policy associated with a token can be updated until the token has been deleted from the token store or is expired. For example, the token access policy can be updated to modify the conditions for when the set of user data that backs a token can be returned to/resolved for a request.

At 618, the token access policy associated with the token is updated.

At 620, whether the token has been deleted or is expired is determined. In the event that the token has been deleted or is expired, process 600 ends. Otherwise, in the event that the token has not been deleted or is not expired, control is returned to 612. For example, the token can be determined to be deleted if no entries in the token store include that token or if an entry exists, the associated token access policy is a post deletion access policy, which is an access policy specifically for tokens that have been deleted. For example, the token can be determined to be expired if the entry that includes the token includes an expiration date that has passed.

In some embodiments, the token generation request can be leveraged to perform bulk token creation by passing an array of user data as an argument and in response, an array of tokens can be generated and returned by applying process 600 to each user data value in the array.

The following is an example application for process 600:

An application wants to create a set of stable globally unique IDs (GUIDs) to share with a partner instead of using emails/usernames.

1. Create the token for a user (with user ID "username") using a token generation request (e.g., CreateToken (GenerationPolicy(GUID, ID), username)) to obtain the generated token "GUID."
2. Use the token ("GUID") to create an account on the partner's service CreateAccount(GUID . . . ).
3. Store the token locally (e.g., in association with the corresponding user ID) to make calls to the partner service as needed.
4. On new installs, call the token lookup request (e.g., LookUpToken(username)) to look up the token for that user, which can be stored locally to call the partner service.
5. If the user account is deleted, call DeleteToken(GUID).

Figure 7:
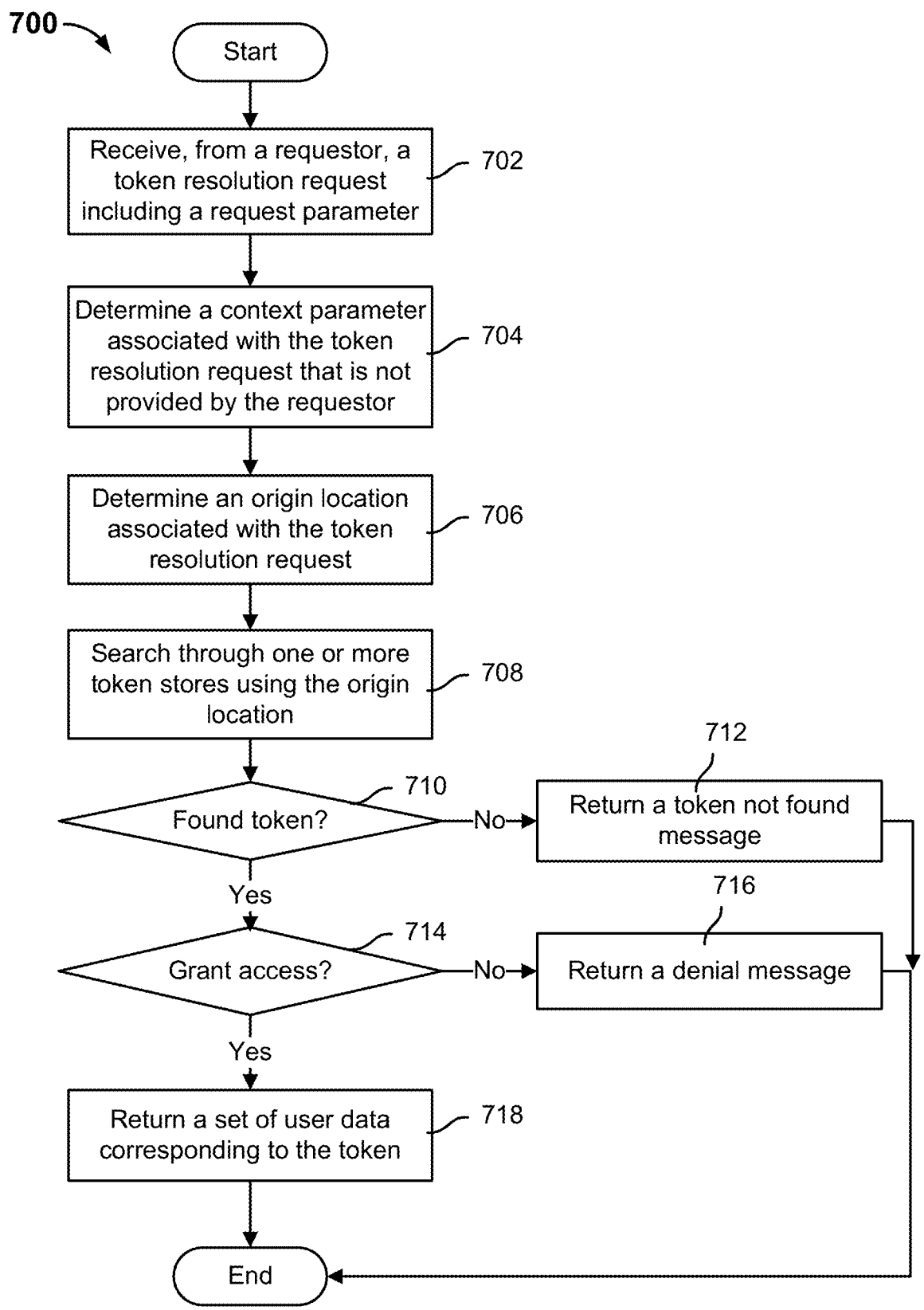
FIG. 7 is a flow diagram showing an example of a process for resolving a token in accordance with some embodiments.

FIG. 7 is a flow diagram showing an example of a process for resolving a token in accordance with some embodiments. In some embodiments, process 700 is implemented by tokenizer server 102 of FIG. 1. Step 506 of process 500 of FIG. 5 may be implemented, at least in part, using process 700.

At 702, a token resolution request including a request parameter is received from a requestor. The token resolution request includes one or more request parameters that are provided by the requestor of the request. Examples of request parameters include identifying information associated with a token (for which the set of user data backing that token is requested) and a purpose for the requested user data.

At 704, a context parameter associated with the token resolution request that is not provided by the requestor is determined. While a request parameter can be specified by the requestor as an argument in the token resolution request, in contrast, a context parameter associated with the token resolution request is not passed as an argument in the token resolution request and is instead, derived from the metadata of the token resolution request and/or queried from a third-party server regarding the token resolution request. A first example of a context parameter is a time of day and can be derived from the metadata associated with the token resolution request. A second example of a context parameter is an origin location of the request, which could be derived from the IP address associated with the requestor. A third example of a context parameter is a role or a set of permissions that are associated with the requestor and can be determined by querying an authorization server based on identifying information (e.g., an authentication token) of the requestor that is provided in the token resolution request as a request parameter. In a specific example, the token resolution request includes as the request parameters the following: a token value, a purpose of technical support, the name of the customer support agent, and the name of an end user for which support is desired. In this specific example, the token resolution request is intended to retrieve the user data that backs the passed in token value, which should be user data of the end user for which the technical support is sought. A context parameter in this example can be obtained by querying a third party server that manages customer support tickets to determine the following context parameter: whether there exists a ticket that identifies the customer support agent in the token resolution request as being assigned to provide support to the end user in the token resolution request.

At 706, an origin location associated with the token resolution request is determined. An origin location of the token resolution request can be determined from its IP address or a hint provided by the request.

At 708, one or more token stores are searched through using the origin location. Where the token store comprises a distributed storage with different instances of the token store being physically located in different locations, the search for the entry that relates to the token resolution request may start with the instance of the token store that is closest to the origin location of the token resolution request. The closest token store is searched for an entry that includes the token that is identified in the token resolution request and if the entry cannot be found at that location, the search continues at one or more other locations until either the entry is found or all locations/instances of the token store are searched but no matching entry is found.

At 710, whether the token is found is determined. In the event that the token is found, control is transferred to 714. Otherwise, in the event that the token is not found, control is transferred to 712.

At 712, a token not found message is returned. If a token store entry that includes the token identified in the token resolution request cannot be found, then a token not found message is returned to the requestor.

At 714, whether access to a set of user data backing the token is granted is determined. In the event that access to a set of user data backing the token is granted, control is transferred to 718. Otherwise, in the event that access to a set of user data backing the token is denied, control is transferred to 716. In the event that a token store entry that includes the token identified in the token resolution request can be found, then the token access policy that is identified by that entry is evaluated against the request parameter(s) and context parameter(s) associated with the token resolution request. Specifically, the conditions described by the token access policy to grant resolution of the token are compared to the request parameter(s) and context parameter(s) associated with the token resolution request to determine whether the parameters meet those conditions.

At 716, a denial message is returned. In the event that the conditions described by the token access policy were not met by the parameters, then a denial message is returned.

At 718, a set of user data corresponding to the token is returned. In the event that the conditions described by the token access policy were met by the parameters, then the set of user data that is included in the matching token store entry is returned. In some embodiments, in the event that the token access policy indicates to first transform (e.g., by injecting noise into or obfuscating a portion of) the set of user data, then the set of user data is first transformed and then the transformed data is returned to the requestor.

Figure 8:
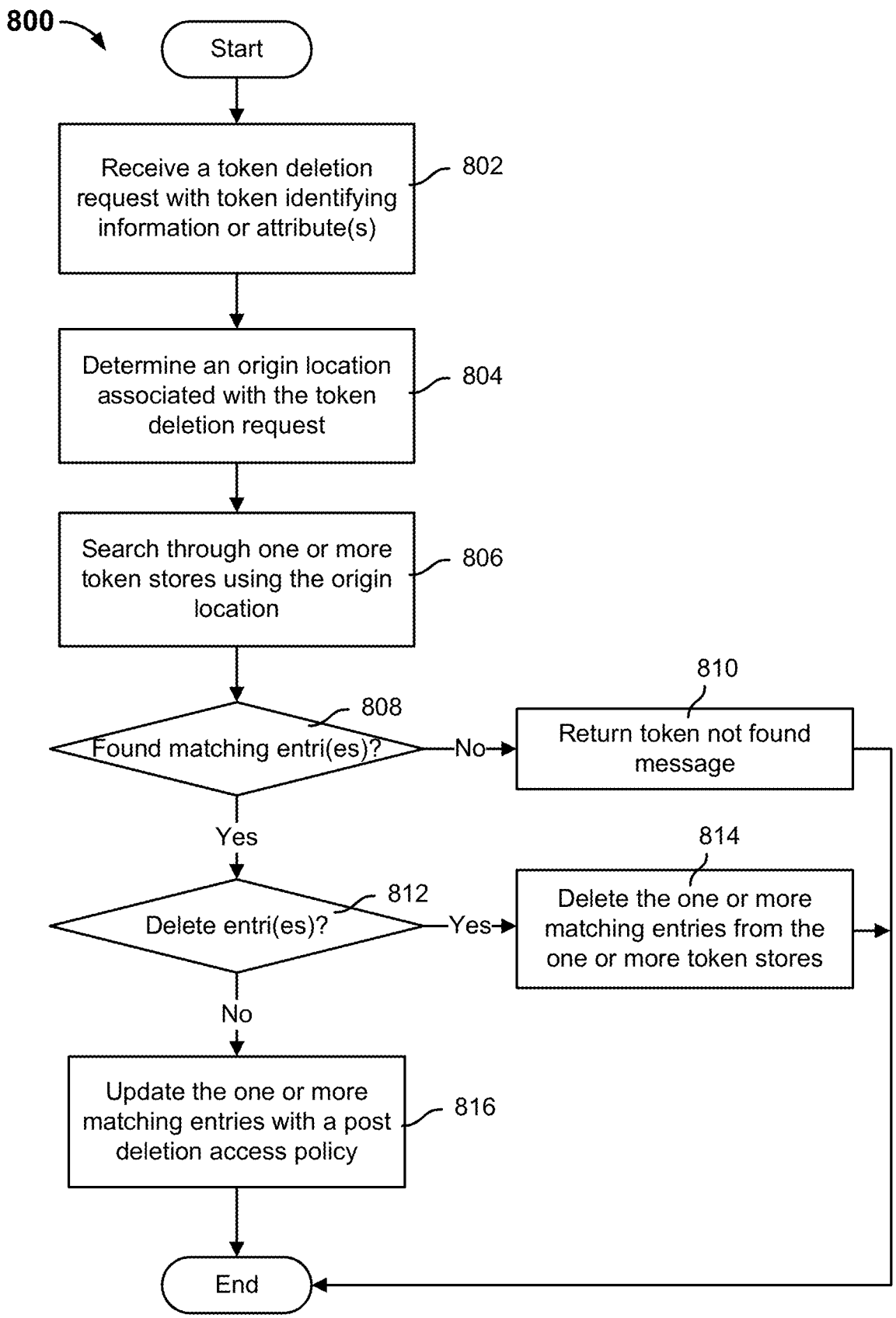
FIG. 8 is a flow diagram showing an example of a process for deleting a token in accordance with some embodiments.

FIG. 8 is a flow diagram showing an example of a process for deleting a token in accordance with some embodiments. In some embodiments, process 800 is implemented by tokenizer server 102 of FIG. 1.

At 802, a token deletion request with token identifying information or attributes is received. The token deletion request may include either a token value, a token ID, or one or more attributes that are associated with user data that back/are represented by token(s). For example, an attribute comprises a user ID, a project ID, a data type, a path, a prefix in the token value, or a suffix in the token value.

At 804, an origin location associated with the token deletion request is determined. An origin location of the token deletion request can be determined from its IP address or a hint provided by the request.

At 806, one or more token stores are searched through using the origin location. Where the token store comprises a distributed storage with different distances of the token store being physically located in different locations, the search for one or more entries that information that matches to the token identifying information of the token deletion request may start with the instance of the token store that is closest to the origin location of the token deletion request. The closest token store is searched for matching entr(ies) related to the token deletion request and if the entry cannot be found at that location, the search continues at one or more other locations until either the entry is found or all locations/instances of the token store are searched but no matching entry is found.

At 808, whether one or more matching entries are found is determined. In the event that one or more matching entries are found, control is transferred to 812. Otherwise, in the event that no matching entry is found, control is transferred to 810.

At 810, a token not found message is returned. If a token store entry that includes the token identified in the token deletion request cannot be found, then a token not found message is returned to the requestor.

At 812, whether the one or more matching entries are to be deleted is determined. In the event that the one or more matching entries are to be deleted, control is transferred to 814. Otherwise, in the event that the one or more matching entries are not to be deleted, control is transferred to 816. For example, the token access policy of the matching entries or another associated policy/instruction may designate that the token store entry of a "deleted" token is to be retained in the token store for a predetermined length of time. Such entries could be retained for fraud detection or auditing purposes, for example.

At 814, the one or more matching entries are deleted from the one or more token stores. If a retention period is not needed for a "deleted" token, then the matching entr(ies) can be immediately removed or otherwise marked for garbage collection at the token store(s).

At 816, the one or more matching entries are updated with a post deletion access policy. If a retention period is needed for a "deleted" token, then the token access policy that is stored in the matching entr(ies) can be updated to refer to a post deletion access policy. When any of the entries of the token store(s) match a subsequent request, then the post deletion access policy will prohibit the token or user data referred to therein from being returned unless the specified purpose of the request matched one of the limited enumerated purposes (e.g., fraud detection) identified in the post deletion access policy. In some embodiments, the post deletion access policy may include an expiration date for the associated token such that the entry can be deleted once that expiration date is passed through a process of garbage collection at the token store(s), as will be described in FIG. 9.

In some embodiments, if a matching entry did not include the user data backing the token but rather just a reference to the token, then the deletion of the entry (which comprises just a mapping between the user data and the token) would not delete the user data. However, by deleting the mapping of the token to the user data, the "deleted" token would become unresolvable, which effectively deletes the user data from any location at which the token was stored/used. The data sets that contained literal user data still need to be handled separately for deletion.

As described in process 800, deletion of a token can be efficiently performed by either deleting a token store entry corresponding to the token or by modifying the token access policy for that token. Either way, the "deleted" token can no longer be resolved (at all or only for limited purposes) and so there is no need to search through data sets and then delete each presence of the token.

In accordance with some embodiments, at runtime, the system is configured to handle the following requests with respect to the lifecycle of a token:

1. First CreateToken(GenerationPolicy, AccessPolicy, Data, Attributes) is called to create the token. The token generation policies can be specified inline by policy_id if the policies were previously created via the CreatePolicy( . . . ) API. For bulk creation, CreateTokens API takes an array of data and returns an array of tokens.
2. The returned tokens are used in the data sets instead of the literal value. If the token generation policy specified that the token should be retrievable, then LookUpToken(Data) will return the same token value as was returned by CreateToken.
3. In order to resolve the data behind the token, ResolveToken(<describe parameters>) API is called and the data or the reference to the data is returned if the token access policy constraints are met. Otherwise, it returns "NotAuthorized."
4. ExamineToken( ) API can be used to get metadata about the token and the details of the token access policy.
5. Once the token(s) are no longer needed, they can be deleted with DeleteTokens(Tokens, Attributes). If only Attributes are specified in the DeleteTokens( ) API call, then all tokens with matching attributes are deleted. This is convenient for deleting all tokens associated with a particular user_id, which can be used as an attribute, for example.

The following is a flow associated with an example use case of generating and using a token, involving a server side-data pipeline for replacing some personally identifiable information (PII) (e.g., current city) with tokens without losing the ability to count and group:

1. Create the token for the user CreateToken(GenerationPolicy(AlphaNumeric(10), Persistent(Seed)), city name)→ token which is a 10 digit alphanumeric combination. The same token is returned for the same city name if the same seed is specified. The caller can decrease the chance of probabilistic city identification by asking the API to add noise by randomly returning nearby cities.
2. Use the token for next set of the pipeline.
3. Once analysis is complete, call ResolveToken(token)→ city name.
4. Call DeleteToken(token) once the data set is no longer needed.

Figure 9:
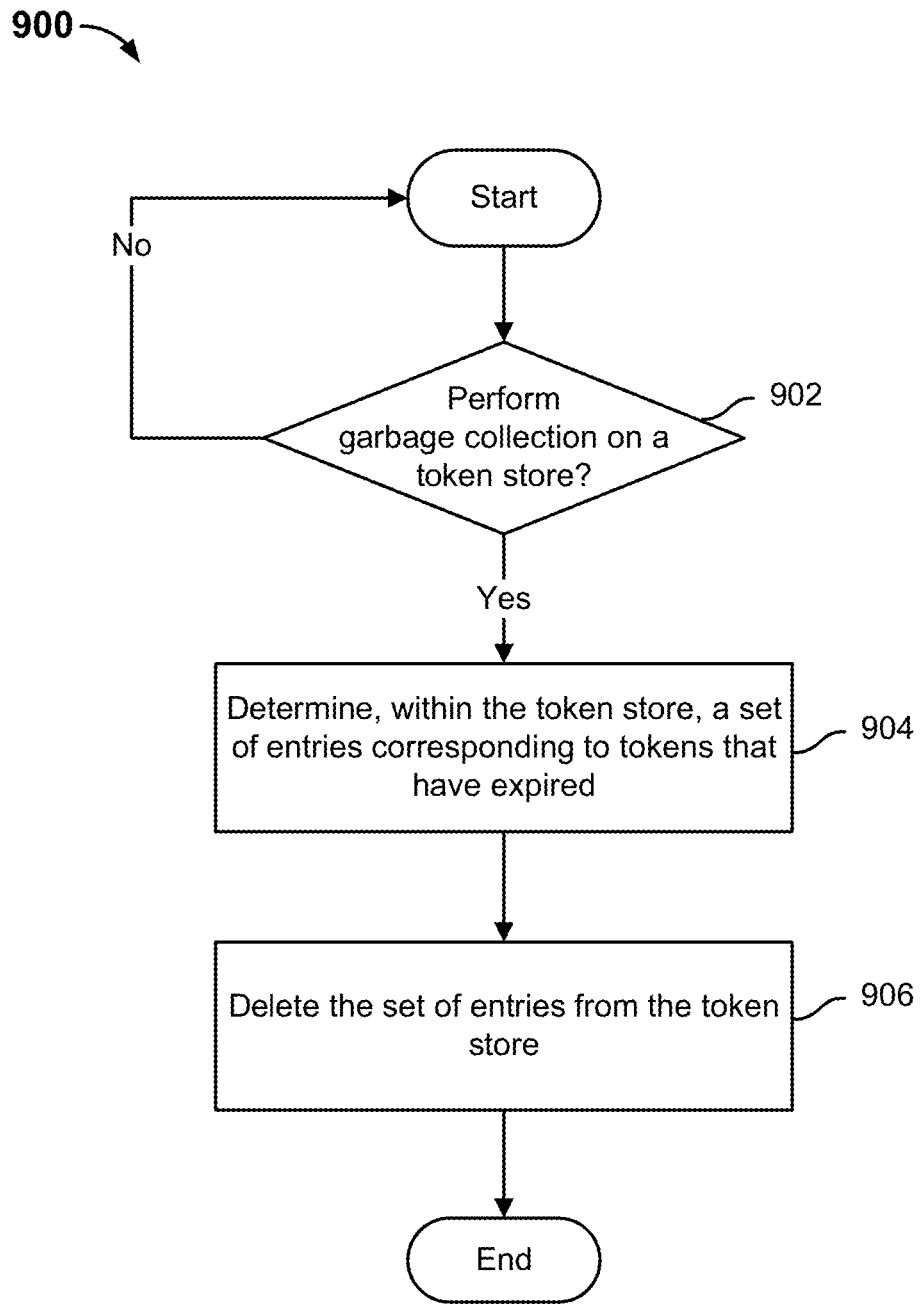
FIG. 9 is a flow diagram showing an example of a process for performing garbage collection at a token store in accordance with some embodiments.

FIG. 9 is a flow diagram showing an example of a process for performing garbage collection at a token store in accordance with some embodiments. In some embodiments, process 900 is implemented by tokenizer server 102 of FIG. 1.

At 902, whether garbage collection is to be performed on a token store is determined. In the event that garbage collection is to be performed on the token store, control is transferred to 904. Otherwise, in the event that garbage collection is not to be performed on the token store, control returns to 902 after a wait. For example, garbage collection can be opportunistically performed at the token store (e.g., when there are no searches or few searches being performed at the token store), performed periodically, or performed in response to a trigger event.

At 904, a set of entries corresponding to tokens that have expired is determined. Each entry of the token store is checked for those with expiration dates or are associated with token access policies that specify expiration dates that have past (relative to the time of checking). These entries are therefore expired and should be removed from the token store since their associated tokens should no longer be resolvable.

At 906, the set of entries is deleted from the token store. The entries associated with expired tokens are removed from the token store.

FIG. 10A is a diagram showing an example user interface that is configured to enable configuration and testing of a token generation policy at design time. As shown in FIG. 10A, parameters input window 1002 includes various parameters of the token generation policy for which a user can modify/edit to customize the policy before it is stored by a tokenizer server (e.g., such as tokenizer server 102 of FIG. 1). In some embodiments, the user interface of FIG. 10A is provided by the tokenizer server at a client device (e.g., that is used by a developer of a to customer of tokenizer server). In particular, FIG. 10A shows the configuration of a token generation policy for generating a token for an input email address. Parameters input window 1002 shows parameters associated with generating token portions corresponding to different parts of an email address. As shown in FIG. 10A, the parameters and parameter values for generating a token portion corresponding to a username (or local-part) include "PreserveValue": false, "PreserveChars": 0, and "FinalLength": 12. These parameters dictate that the token portion corresponding to the username/local-part portion of an email address should not preserve any of the original characters of the username/local-part but that the corresponding token portion should have 12 characters. As shown in FIG. 10A, the parameters and parameter values for generating a token portion corresponding to a domain name include "PreserveValue": false, "PreserveCommonValue": true, "PreserveChars": 0, and "FinalLength": 6. These parameters dictate that the token portion corresponding to the domain name of an email address should not preserve any of the original characters of the domain name unless it was a common domain name. To test what kind of token the configured parameters of parameters input window 1002 would result in at runtime, the user inputs the email of "jane@gmail.com" into test data input window 1004 and selects "Run Test" button 1006. In response to the selection of "Run Test" button 1006, the tokenizer server generates a token corresponding to the input of "jane@gmail.com" that is "k0CJJBnsHWIH@gmail.com" (as shown in result window 1008) based, at least in part, on the configured parameters of the token generation policy as shown in parameters input window 1002 of FIG. 10A. Because "gmail.com" is a common email domain name, it was preserved within the resulting token, per the current parameters of the token generation policy.

FIG. 10B is a diagram showing another example user interface that is configured to enable configuration and testing of a token generation policy at design time. The example user interface of FIG. 10B is similar to the example user interface of FIG. 10A, only that in parameters input window 1002, the parameters that dictate that the token portion corresponding to the domain name of an email address should not preserve any of the original characters of the domain name and instead to generate a token portion comprising 8 characters. As such, for the same user input of "jane@gmail.com" into test data input window 1004, the resulting token that is shown in result window 1008 is "gyT2526myHxC@pouOPH31.com," given the updated parameters of the token generation policy.

FIG. 11A is a diagram showing an example user interface that is configured to enable configuration and testing of a token access policy at design time. As shown in FIG. 11A, function input window 1002 provides an input window in which a user can provide a method for granting resolution to a request to resolve a token in a token access policy. In the example of FIG. 11A, the method described in input window 1002 describes that if a token resolution request includes a parameter with the purpose of the request specified as "marketing," then the request will be granted. A user can modify/edit the method described in function input window 1002 to customize the policy before it is stored by a tokenizer server (e.g., such as tokenizer server 102 of FIG. 1). In some embodiments, the user interface of FIG. 11A is provided by the tokenizer server at a client device (e.g., that is used by a developer of a customer of tokenizer server 102). In FIG. 11A, context input window 1104 provides an input window in which a user can provide context parameters of a hypothetical token resolution request to test whether, when the context parameters are evaluated against the token access policy that is described in function input window 1002, the token resolution request will be granted or denied. As described above, at runtime, the context parameters are dynamically determined for each token resolution request by the tokenizer server. To test whether a token resolution request with the context parameters as shown in context input window 1004 would result in an access (resolution) grant or denial at runtime, the user selects "Run Test" button 1106. In response to the selection of "Run Test" button 1106, the tokenizer server evaluates the context parameters (e.g., "ip_address": "127.0.0.1"; "resolver": {"username": "bob"}; "action": "resolve"; "client": {"purpose": "marketing"}) against the token access policy described in function input window 1102 to determine that this request would be granted at runtime (as indicated by the "Access allowed" message in result window 1108). In the example of FIG. 11A, the token resolution request was granted because the "purpose" parameter of the request specified "marketing," which met the only condition described in the example token access policy.

FIG. 11B is a diagram showing another example user interface that is configured to enable configuration and testing of a token access policy at design time. The example user interface of FIG. 11B is similar to the example user interface of FIG. 11A, only that in context input window 1104, the context parameters have been modified to indicate that the "purpose" parameter of the token resolution request is now "security." In response to the selection of "Run Test" button 1106, the tokenizer server evaluates the context parameters (e.g., "ip_address": "127.0.0.1"; "resolver": {"username": "bob"}; "action": "resolve"; "client": {"purpose": "security"}) against the token access policy described in function input window 1002 to determine that this request would be denied at runtime (as indicated by the "Access denied" message in result window 1108). In the example of FIG. 11B, the token resolution request was denied because the "purpose" parameter of the request specified "security," which did not meet the only condition described in the example token access policy.

Below are some advantages of the token generation and management system described herein:

Privacy—The system can help application developers implement data use minimization or ensure purpose-based use by replacing sensitive data with pseudonymous tokens.

The system makes it easy to create, keep track of, and resolve tokens so that the application developer can avoid manual processes.

Data Security—The system can help application developers make data sets less valuable to both external and internal attackers. Pseudonymous tokens have no value to hackers or competing application developers.

Data Sharing—The system can help application developers share data records for processing with partners and researchers without sharing sensitive data itself. External parties can do grouping, counting, and matching without knowing the actual value.

Data Deletion—Deleting all data for a user from across all systems can be hard. In various embodiments, when a user's data (which has been tokenized) is to be deleted, only that user's token entry needs to be deleted and so chasing relevant data down in all the data sets can be avoided. Since the token can no longer be resolved, the user data is effectively deleted. For example, a user ID can be added as an attribute on all tokens for that user and so that user's data can then be deleted with a single API call.

Data Isolation—The system can help application developers restrict data usage by restricting who can resolve tokens. That way, data does not need to be filtered or removed from data sets as they move across an organization.

Easy to Use—The system can be up and running in 5 minutes and application developers only have to interact with a few simple APIs to start.

Flexible Token Generation—The system can generate tokens to be used as user IDs in external systems matching a formatting template. This makes it easy to protect emails, phone numbers, or names without changing the interfaces or pipelines. Or it can generate tokens with properties of a one-way hash to protect information like cities, zip codes, occupations, health information, etc. so that analysis can be performed without risk. It can also manage noise injection if desired to protect data with low cardinality from re-identification. For example, how a token can be generated is based on the generation policy. The flexibility of the policy is one of the ways the system saves engineers work. For example, a phone number can map to a random alphanumeric code which is different every time the same phone number is given to the system. This means that a person looking for the resulting data set will not know which of the phone numbers are same. The phone number can be mapped to an alphanumeric string which is always the same for a given number. This can be done via a hash or by storing the record connecting the token and the number. Also, the alphanumeric can be specified to fit a format like (xxx)xxxxxxx or it can be only numeric, etc.

Per Token Security Policy—Application developers can configure comprehensive access policies for whom, for how long, and from where in an organization, a particular token or token set can be resolved. For example, application developers can configure garbage collection for tokens over a certain age, or limit them to administrative access only.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory; and
a processor coupled to the memory and configured to:
generate a token corresponding to a set of user data based at least in part on a token generation policy, wherein to generate the token comprises to add a predetermined value within the token;
store a mapping between the token and the set of user data;
determine whether to grant a token resolution request associated with the token based at least in part on a token access policy associated with the token and a context parameter associated with the token resolution request, wherein the context parameter is not included as an argument in the token resolution request, wherein to determine whether to grant the token resolution request comprises to:
in response to receiving the token resolution request, dynamically determine the context parameter by querying a third-party server using a request parameter that is included in the token resolution request to determine a relationship between a requestor associated with the token resolution request and a principal associated with the set of user data; and
determine whether the determined relationship matches a specified relationship for which the token is permitted to be resolved in accordance with the token access policy;
receive a token deletion request comprising the predetermined value; and
in response to a determination that the token comprises the predetermined value, cause the mapping to be associated with a post deletion access policy, wherein the post deletion access policy comprises an expiration date to be associated with the mapping.

2. The system of claim 1, wherein to generate the token comprises to preserve at least a portion of the set of user data in the token.

3. The system of claim 1, wherein to generate the token comprises to preserve a data format of the set of user data in the token.

4. The system of claim 1, wherein the mapping further comprises one or more of the following: a set of attributes associated with the set of user data, identifying information associated with the token generation policy, and identifying information associated with the token access policy.

5. The system of claim 1, wherein to store the mapping between the token and the set of user data comprises to:
select a selected token store from a plurality of token stores located in a plurality of geographic locations; and
store the mapping at the selected token store.

6. The system of claim 1, wherein the processor is further configured to:
determine to grant the token resolution request;
transform the set of user data based at least in part on the token access policy; and
return the transformed set of user data.

7. The system of claim 1, wherein the processor is further configured to:
receive a token lookup request comprising the set of user data;
locate the mapping between the token and the set of user data in a token store; and
return the token from the mapping.

8. The system of claim 1, wherein the processor is further configured to:
    determine that the expiration date has passed; and
    delete the mapping.

9. The system of claim 1, wherein the processor is further configured to:
    determine, from a token store, a set of mappings between tokens and sets of user data that have expired; and
    delete the set of mappings from the token store.

10. A method, comprising:
    generating a token corresponding to a set of user data based at least in part on a token generation policy, wherein generating the token comprises adding a predetermined value within the token;
    storing a mapping between the token and the set of user data;
    determining whether to grant a token resolution request associated with the token based at least in part on a token access policy associated with the token and a context parameter associated with the token resolution request, wherein the context parameter is not included as an argument in the token resolution request, wherein determining whether to grant the token resolution request comprises:
        in response to receiving the token resolution request, dynamically determining the context parameter by querying a third-party server using a request parameter that is included in the token resolution request to determine a relationship between a requestor associated with the token resolution request and a principal associated with the set of user data; and
        determining whether the determined relationship matches a specified relationship for which the token is permitted to be resolved in accordance with the token access policy;
    receiving a token deletion request comprising the predetermined value; and
    in response to a determination that the token comprises the predetermined value, causing the mapping to be associated with a post deletion access policy, wherein the post deletion access policy comprises an expiration date to be associated with the mapping.

11. The method of claim 10, wherein generating the token comprises preserving at least a portion of the set of user data in the token.

12. The method of claim 10, wherein generating the token comprises preserving a data format of the set of user data in the token.

13. The method of claim 10, wherein the mapping further comprises one or more of the following: a set of attributes associated with the set of user data, identifying information associated with the token generation policy, and identifying information associated with the token access policy.

14. The method of claim 10, wherein storing the mapping between the token and the set of user data comprises:
    selecting a selected token store from a plurality of token stores located in a plurality of geographic locations; and
    storing the mapping at the selected token store.

15. The method of claim 10, further comprising:
    determining that the expiration date has passed; and
    deleting the mapping.

16. A computer program product, the computer program product being embodied in a non-transitory computer readable medium and comprising computer instructions for:
    generating a token corresponding to a set of user data based at least in part on a token generation policy, wherein generating the token comprises adding a predetermined value within the token;
    storing a mapping between the token and the set of user data;
    determining whether to grant a token resolution request associated with the token based at least in part on a token access policy associated with the token and a context parameter associated with the token resolution request, wherein the context parameter is not included as an argument in the token resolution request, wherein determining whether to grant the token resolution request comprises:
        in response to receiving the token resolution request, dynamically determining the context parameter by querying a third-party server using a request parameter that is included in the token resolution request to determine a relationship between a requestor associated with the token resolution request and a principal associated with the set of user data; and
        determining whether the determined relationship matches a specified relationship for which the token is permitted to be resolved in accordance with the token access policy;
    receiving a token deletion request comprising the predetermined value; and
    in response to a determination that the token comprises the predetermined value, causing the mapping to be associated with a post deletion access policy, wherein the post deletion access policy comprises an expiration date to be associated with the mapping.

* * * * *